United States Patent
Kourzanov

(10) Patent No.: US 10,057,926 B2
(45) Date of Patent: Aug. 21, 2018

(54) WIRELESS NETWORK AND METHOD

(71) Applicant: NXP B.V., Eindhoven (NL)

(72) Inventor: Petr Kourzanov, Eindhoven (NL)

(73) Assignee: NXP B.V., Eindhoven (NL)

( * ) Notice: Subject to any disclaimer, the term of this patent is extended or adjusted under 35 U.S.C. 154(b) by 219 days.

(21) Appl. No.: 14/702,998

(22) Filed: May 4, 2015

(65) Prior Publication Data

US 2015/0351129 A1     Dec. 3, 2015

(30) Foreign Application Priority Data

May 29, 2014    (EP) .................................. 14170466.8

(51) Int. Cl.
*H04W 74/08*     (2009.01)
*H04W 40/24*     (2009.01)
(Continued)

(52) U.S. Cl.
CPC ......... *H04W 74/085* (2013.01); *H04W 8/005* (2013.01); *H04W 24/08* (2013.01);
(Continued)

(58) Field of Classification Search
CPC ........... H04W 74/085; H04W 74/0816; H04W 24/08; H04W 24/10; H04W 40/24; H04W 8/005; H04W 84/12
See application file for complete search history.

(56) References Cited

U.S. PATENT DOCUMENTS 5,661,727 A * 8/1997 Kermani ............... H04W 48/18
                                                 348/423.1
7,184,407 B1     2/2007 Myles et al.
(Continued)

FOREIGN PATENT DOCUMENTS

CN         101635654 A     1/2010
EP         1 764 961 A1     3/2007
(Continued)

OTHER PUBLICATIONS

English translation of Yoshizawa et al. JP2004173146, Jun. 2004, Japan.*
(Continued)

*Primary Examiner* — Kwang B Yao
*Assistant Examiner* — Moo Ryong Jeong

(57) ABSTRACT

A network node for a wireless network and corresponding methods for reducing false collisions in a wireless network, a wireless network, a wireless sensor network and a smart building including a wireless sensor network. The network node includes a processor, memory and an antenna. The network node is operable promiscuously to monitor and maintain a record of transmissions and acknowledgements received by the network node. The network node is also operable to send information relating to the record to another node in the network for use by the other node in determining that a further node to which the other node sends transmissions is hidden from the network node. In another aspect the network node is operable to determine from information received from a second other network node, that a first other network node is hidden from the second other network node.

12 Claims, 7 Drawing Sheets

(51) Int. Cl.
*H04W 8/00* (2009.01)
*H04W 84/12* (2009.01)
*H04W 24/10* (2009.01)
*H04W 24/08* (2009.01)

(52) U.S. Cl.
CPC .......... *H04W 24/10* (2013.01); *H04W 40/24* (2013.01); *H04W 74/0816* (2013.01); *H04W 84/12* (2013.01)

(56) References Cited

U.S. PATENT DOCUMENTS

| | | |
|---|---|---|
| 7,616,585 B1 | 11/2009 | Kritov et al. |
| 2003/0043744 A1 | 3/2003 | Lu et al. |
| 2006/0028984 A1* | 2/2006 | Wu .................. H04W 52/0216 370/230 |
| 2006/0268887 A1 | 11/2006 | Lu |
| 2007/0115907 A1* | 5/2007 | Myles .................. H04W 16/14 370/338 |
| 2010/0118727 A1 | 5/2010 | Draves, Jr. |
| 2010/0232291 A1* | 9/2010 | Hirota .................. H04L 47/125 370/229 |
| 2011/0013571 A1* | 1/2011 | Sawai .................. H04W 16/14 370/329 |
| 2012/0196636 A1 | 8/2012 | Pratt, Jr. |
| 2013/0051323 A1 | 2/2013 | Song et al. |
| 2013/0188513 A1* | 7/2013 | Vasseur .............. H04W 40/248 370/254 |
| 2015/0117383 A1 | 4/2015 | Liu |

FOREIGN PATENT DOCUMENTS

| | | | |
|---|---|---|---|
| GB | 2 412 273 A | 9/2005 | |
| JP | 2004173146 | * 6/2004 | ............. H04L 17/28 |
| JP | 2004173146 A | 6/2004 | |
| WO | WO-2010/096031 A1 | 8/2010 | |

OTHER PUBLICATIONS

IEEE Standard; "Specification 802.15.4: Wireless Medium Access Control (MA) and Physical Layer (PHY) Specifications for Low-Rate Wireless Personal Area Networks (LR-WPANs)—2003"; IEEE, New York, NY, US; 679 pages (2003).

ZigBee Alliance; "ZigBee Specification"; San Ramon, CA, US; 622 pages(Sep. 2012).

IEEE Standard; "Part 15.4: Low-Rate Wireless Personal Areas Networks (LR_WPANs), Amendment 1: MAC sublayer"; IEEE, New York, NY, US; 225 pages (Apr. 16, 2012).

Office Action from U.S. Appl. No. 14/702,916 (Aug. 11, 2016).

Extended European Search Report for Application No. 14180248.8 (dated Oct. 9, 2015).

Gafur, M Abdul et al; "An Enhanced Virtual Carrier Mechanism for MANET With Multi Rate Traffic Subdomains"; 2013 Fourth Int'l Conf. on computing, Communications and Networking Technologies; 5 pages (Jul. 1, 2013).

Mangold, Stefan et al; "Analysis of IEEE 802.11E for QoS Support in Wireless LANs"; IEEE Personal Communications, vol. 10, No. 6, USA; pp. 40-50 (Dec. 1, 2003).

Final Office Action from U.S. Appl. No. 14/702,916; 30 pages (dated Feb. 23, 2017).

Notice of Allowance; U.S. Appl. No. 14/702,916; 21 pages (dated Sep. 21, 2017).

Mangold, Stefan et al; "Analysis of IEEE 802.11E for QoS Support in Wireless Lans"; The Evolution of Wireless LANs and PANs; IEEE Wireless Communication; 11 pages (Dec. 2003).

* cited by examiner

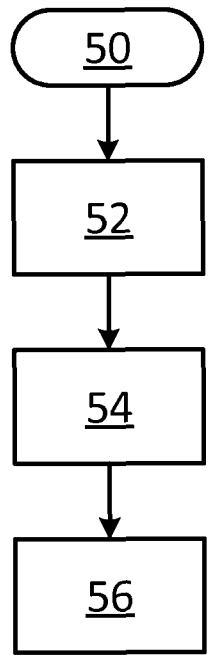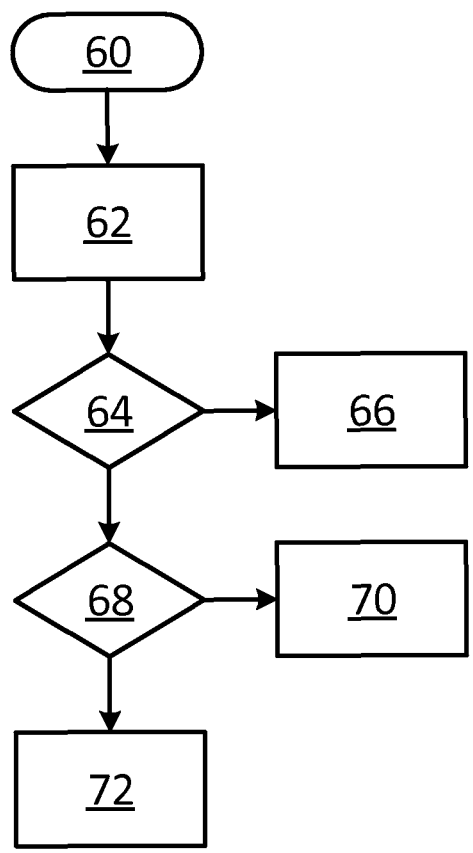
Figure 5
Figure 6

WIRELESS NETWORK AND METHOD

CROSS-REFERENCE TO RELATED APPLICATIONS

This application claims the priority under 35 U.S.C. § 119 of European patent application no. 14170466.8, filed on May 29, 2014, the contents of which are incorporated by reference herein.

FIELD OF THE INVENTION

This invention relates to a wireless network and method.

BACKGROUND OF THE INVENTION

CSMA/CA (Carrier Sense Multiple Access with Collision Avoidance) is a well-known media access control (MAC) protocol used in networks having a shared carrier medium (e.g. wireless local area networks (WLANs)). Under this protocol, nodes in the network sense the transmissions made by other nodes over the shared carrier medium and defer their own transmissions until the network becomes idle. In some examples, each node may wait for a random period of time, either before (in the case of IEEE 802.15.4) or after (in the case of IEEE 802.11) a clear channel assessment (CCA), so as to reduce the probability of two or more nodes, sensing that the network has become idle, beginning to transmit at the same time, causing a collision.

In a wireless network, it may often be the case that nodes are unable to sense transmissions made by other nodes. This may be because the nodes are not within range of each other's transmissions, or because of interference or shielding of transmissions caused by the environment (e.g. building) in which the nodes are located.

The hidden node problem (HNP) describes a situation in which transmitter nodes in a network are each visible to a receiver node, but in which the transmitter nodes are not visible to each other. Under the HNP a first transmitter node, sensing no activity on the network, may begin a transmission while the receiver node is already receiving a transmission from another transmitter node that is hidden from the first transmitter node. This causes a collision at the receiver node. The carrier sense method under CSMA can therefore fail to avoid collisions under this scenario.

The exposed node problem (ENP) describes a situation in which the transmissions of two transmitter nodes are visible to each other, but in which the receivers of those transmissions are not in range of each other. This can give rise to false collisions at the transmitter nodes, since the CSMA protocol will prevent them from making simultaneous transmissions to their respective receiver nodes, even though this would not in fact lead to a collision at the receiver nodes. The ENP can often arise in networks using the dense tree topology, in which the spatial distribution of the nodes is not correlated with the communication patterns in the network. For example, it may be that the transmitter nodes, although physically located close to each other, may be unrelated routers that serve different branches of the network tree (they have different parent nodes). In some cases, the transmitter nodes, although operating under the same communication standard (e.g. IEEE 802.15.4), may not even belong to the same network.

An example of a Collision Avoidance (CA) protocol that is used with CSMA/CA employs a handshake procedure prior to data transmission in which RTS (Request to Send) and CTS (Clear to Send) messages are exchanged by a transmitter node and the intended receiver node in order to establish that the receiver node is available and ready.

The use of RTS and CTS messages can alleviate the HNP, since the receiver node only sends a CTS message to one transmitter node at a time. Therefore, a transmitter node must wait until it is sent a CTS message from the receiver node before it begins its own transmission, even though it may sense no activity over the carrier medium. Transmitter nodes that are hidden from each other rely on the CTS messages to prevent collisions involving their transmissions at the receiver node.

The use of RTS and CTS messages can also alleviate the ENP. When a first transmitter node hears an RTS message from a neighbouring second transmitter node, but does not then hear a CTS message from the receiver node to which the RTS message was sent, the first transmitter node can deduce that it is an exposed node. Based on this, the first transmitter can then make transmissions to another receiver node in the knowledge that they will not cause collisions at the receiver node to which the initial RTS message was sent.

Although RTS and CTS messages can reduce the occurrence of collisions in a wireless network, they lead to additional congestion in the network and are generally enabled only for large frame sizes. The use of RTS and CTS messages is therefore made optional in the IEEE 802.11 standard.

In some wireless networks, especially those having relatively small maximum transfer unit (MTU) sizes, the additional overhead imposed by the use of RTS/CTS messages may not warrant their use. For instance, the IEEE 802.15.4 standard defines a MTU of 127 bytes. This is especially the case in crowded networks including a large number of densely spaced nodes.

The IEEE 802.15.4 standard specifies the physical layer and MAC layer for low rate wireless personal networks (WPANs). The ZigBee standard is based on IEEE 802.15.4-2003 version and was developed for use in low rate, low power, secure applications. These standards are suitable for use in wireless sensor networks (WSNs) in the home and building automation domain (Smart Buildings). The use of RTS and CTS messages may be too onerous for these kinds of networks, in which low power usage is a requirement. Further, the small MTU sizes in WSN applications may not justify using RTS/CTS messages. This is especially true in the context of the internet of things (IoT), in which the network is anticipated to be extremely crowded with a huge number of nodes.

SUMMARY OF THE INVENTION

Aspects of the invention are set out in the accompanying independent and dependent claims. Combinations of features from the dependent claims may be combined with features of the independent claims as appropriate and not merely as explicitly set out in the claims.

According to an aspect of the invention there can be provided a network node for a wireless network, the network node comprising:
  a processor;
  memory; and
  an antenna,
  wherein the network node is operable:
  promiscuously to monitor transmissions and acknowledgements received by the network node;
  to maintain a record of the transmissions and acknowledgements; and to send information relating to the record to another node in the network for use by the other node in determining that a further node to which the other node sends transmissions is hidden from the network node.

According to another aspect of the invention, there can be provided a method for reducing false collisions in a wireless network, the method comprising a network node:
promiscuously monitoring transmissions and acknowledgements received by the network node;
maintaining a record of the transmissions and acknowledgements; and
sending information relating to the record to another node in the network for use by the other node in determining that a further node to which the other node sends transmissions is hidden from the network node.

By maintaining a record of transmissions and acknowledgements monitored promiscuously by the network node, and by sending information relating to the record to another node in the network, false collisions in the network may be reduced since the other node in the network can be provided with information that may allow it to determine that a further node to which it sends transmissions is hidden from the network node. In some examples, this determination may allow the other network node to transmit to the further network node in the knowledge that these transmissions will not cause a collision. Accordingly, the number of false collisions in the network may be reduced.

In some examples, the information relating to the record may piggy-back (be included in) a normal or regular transmission made by the network node. In this example, the transmission sent by the network node, upon which the information piggy-backs, need not be addressed to the other network node specifically, but may nevertheless be processed by the other network node to extract and use the information.

In alternative example, the information relating to the record may be included in one or more dedicated transmissions by the network node, for the purpose of distributing the information.

The information relating to the record may include an indication of at least one transmission sent by the other network node to the further node and promiscuously monitored by the network node, for which the network node did not observe an acknowledgement. In this example, non-detection of the acknowledgement by the network node may be taken as an indication that transmissions sent by the network node also would not be observable by the further network node. In that case, the other network node may, in some examples, send transmissions to the further node even when the network node is transmitting, on the assumption that this will not in fact cause a collision at the further network node.

The record maintained by the network node may include one or more of the following:
a transmission sequence number;
an indication (e.g. a node ID) of the network node that sent the transmission;
an indication (e.g. a node ID) of the network node to which the transmission was addressed;
an indication (such as a time stamp) as to the time at which the transmission was sent;
an indication (e.g. a flag) as to whether an acknowledgement of the transmission has been observed.

In one example, the network node may allow a predetermined time period to elapse before determining that the acknowledgement has not been observed. The network node may send the information relating to the record to the other node after the predetermined time period has elapsed.

In one embodiment, the information sent to the at least one other node may include at least one transmission sequence number. The sequence number(s) may be used uniquely to identify a respective transmission.

According to a further aspect of the invention, there can be provided a network node for a wireless network, the network node comprising:
a processor;
memory; and
an antenna,
wherein the network node is operable to:
send one or more transmissions to a first other network node and receive acknowledgements of said transmissions from said first other network node;
receive, from a second other network node, information relating to said one or more transmissions; and
determine from said information received from the second other network node, that the first other network node is hidden from the second other network node.

According to another aspect of the invention, there can be provided a method for reducing false collisions in a wireless network, the method comprising a network node:
sending one or more transmissions to a first other network node and receiving acknowledgements of said transmissions from said first other network node;
receiving, from a second other network node, information relating to said one or more transmissions; and
determining from said information received from the second other network node, that the first other network node is hidden from the second other network node.

By receiving, from the second other network node, information relating to one or more transmissions sent by the network node to a first other network node, the network node may determine whether the first other network node is hidden from the second other network node. Following such a determination, the network node may transmit to the first other network node even when the second other network node is transmitting, in the knowledge that its own transmissions are unlikely to collide with those of the second other network node at the first other network node.

In one example, the network node may be operable to maintain a record of transmission(s) it sends to the first other network node. The record may, for example, include sequence number(s) for uniquely identifying each transmission. These sequence numbers can also be included in the transmissions themselves. The network node may be operable to compare the information received from the second other network node with the record to determine that the second other network node did not observe an acknowledgement corresponding to the transmission, whereas the network node itself did receive the acknowledgement. This comparison may include a comparison of transmission sequence numbers.

In some examples, a network node and corresponding method may implement a combination of the functionality described for each aspect of the invention noted above. For instance, a network node may be provided that is operable:
promiscuously to monitor transmissions and acknowledgements received by the network node;
to maintain a record of the transmissions and acknowledgements;
to send information relating to the record to another node in the network for use by the other node in determining that a further node to which the other node sends transmissions is hidden from the network node, wherein the network node is further operable to:
send one or more transmissions to a first other network node and receive acknowledgements of said transmissions from said first other network node;
receive, from a second other network node, information relating to said one or more transmissions; and
determine from said information received from the second other network node, that the first other network node is hidden from the second other network node.

According to a further aspect of the invention, there is provided a wireless network comprising a plurality of nodes of the kind described above.

According to another aspect of the invention, there is provided a wireless sensor network comprising a wireless network of the kind described above in which at least some of the network nodes include one or more environmental sensors.

According to a further aspect of the invention, there is provided a smart building comprising a wireless sensor network of the kind described above.

The wireless network nodes, wireless network and corresponding methods disclosed herein may be compliant with standards such as IEEE 802.11, IEEE 802.15, IEEE 802.15.4, IEEE 802.15.4e and ZigBee. It is envisaged that embodiments of this invention may comply with the 2.4 Ghz version of the IEEE 802.15.4 specification, or indeed with versions operating in other frequency bands.

BRIEF DESCRIPTION OF THE DRAWINGS

Embodiments of the present invention will be described hereinafter, by way of example only, with reference to the accompanying drawings in which like reference signs relate to like elements and in which:

FIGS. 5 and 6 each show a method according to an embodiment of the invention;

DETAILED DESCRIPTION

Embodiments of the present invention are described in the following with reference to the accompanying drawings.

Figure 1:
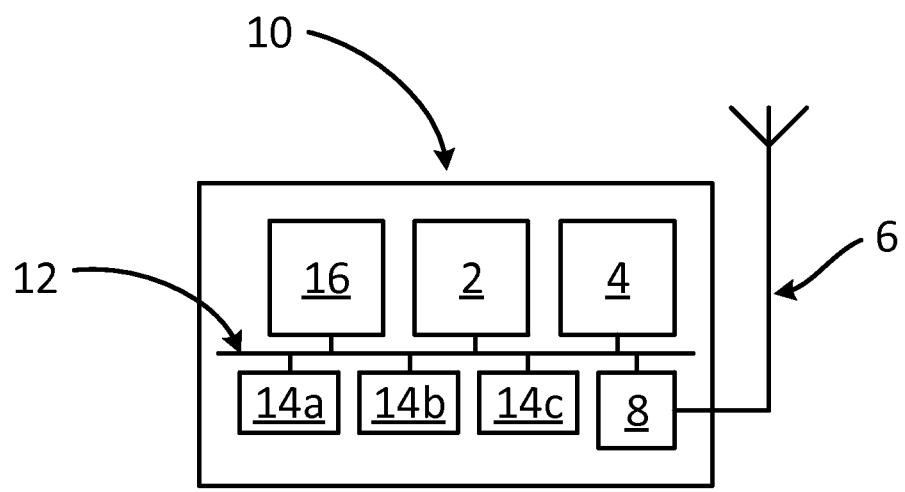
FIG. 1 shows a node for a wireless network in accordance with an embodiment of the invention.

FIG. 1 shows a node 10 for a wireless network in accordance with an embodiment of the invention. The node 10 includes an antenna 6 for transmitting and receiving messages over the network. The node 10 may include an interface 8 including radio frequency components connected to the antenna 6 for processing incoming and outgoing signals. The node 10 can also include a processor 4 for processing data and controlling the operation of the node 10. The node 10 may further include a memory 2 for storing data.

The node 10 may also include one or more environmental sensors 14a, 14b, 14c for use in a wireless sensor network (WSN). The WSN may be provided for use in the home and building automation domain (e.g. in a Smart Building). The environmental sensors may include sensors for measuring temperature, light, humidity, gas composition and/or other environmental conditions.

The node 10 may be associated with objects such as light switches, power switches, heating controls or other features that are typically integrated in an automated building. The node 10 may include I/O circuitry 16 for local connection to these features. For example, the node 10 may serve to identify whether a light switch or heater is currently in an on or an off state. The node 10 can interconnect with features of the switch, heater, etc. through the I/O circuitry 16 to make this determination.

The various components of the node 10 may be connected together via a bus 12.

Figure 2:
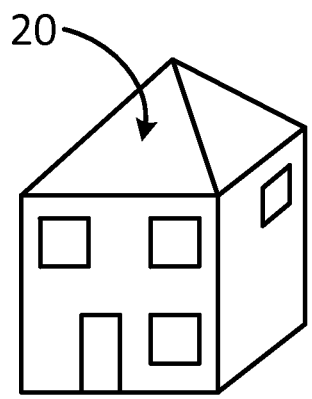
FIG. 2 shows a smart building in accordance with an embodiment of the invention.

FIG. 2 shows a smart building 20 that includes a WSN in accordance with an embodiment of the invention. The building 20 may, for example, be a residential building such as a house of a block of apartments. In other examples, the smart building 20 may be an office, warehouse, public building, green house or other kind of building.

Figure 3A:
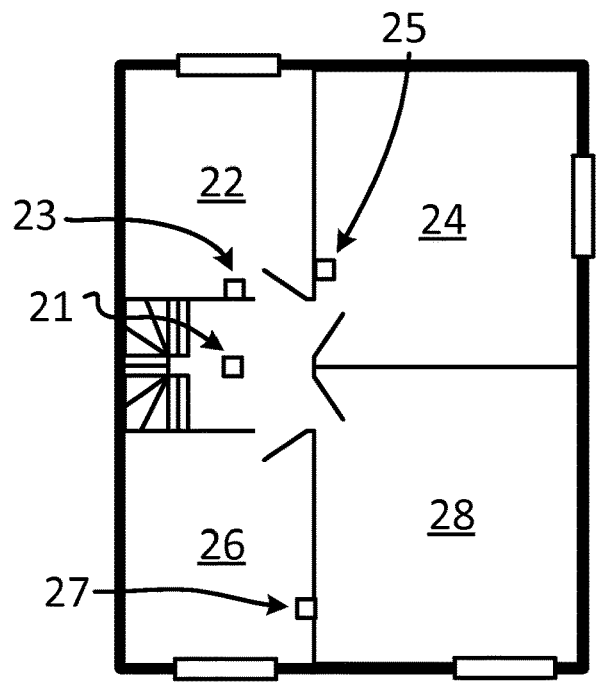
FIGS. 3A and 3B show an interior space of the smart building of FIG. 2A in accordance with an embodiment of the invention.
Figure 3B:
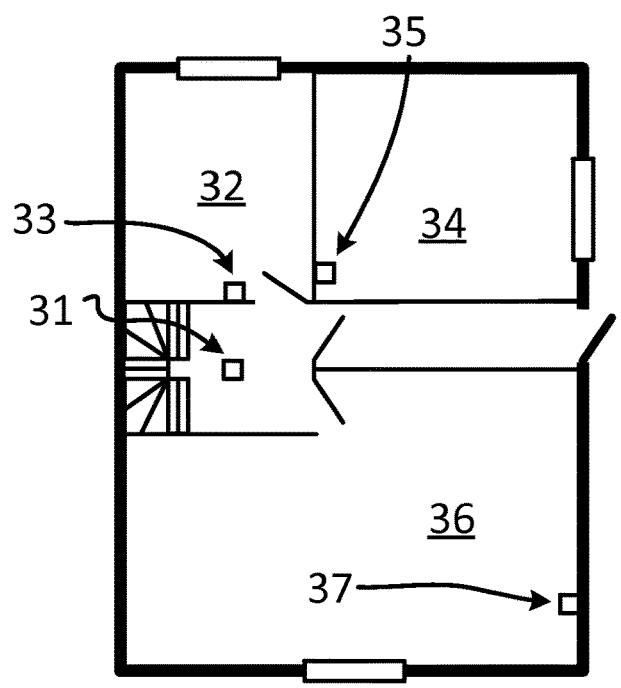

The WSN includes network nodes having environment sensors as described above. For instance, FIGS. 3A and 3B illustrates an interior space of the building 20. In this example, the interior space includes first level shown in FIG. 3A and a second level shown in FIG. 3B. The first level includes a number of rooms 22, 24, 26, 28. The rooms 22, 24, 26 are provided with network nodes 23, 25 and 27 which may communicate wirelessly via a router node 21. The second level also includes a number of rooms 32, 34, 36. The rooms 32, 34, 36 are provided with network nodes 33, 35 and 37 which may communicate wirelessly via a router node 31.

The network nodes 23, 25, 33, 35 in this example are incorporated into light switches in rooms 22, 24, 32, 34, respectively and signal a building automation system (BAS) when the lights switches are operated by sending a message to the BAS through the router node 21 (in the case of nodes 23 and 25) or through the router node 31 (in the case of nodes 33 and 35). Similarly, the network nodes 27 and 37 in rooms 26 and 36 are connected to heaters. When the heaters are operated, the network nodes 27 and 37 may signal this to the BAS via the router node 21 (in the case of node 27) or via the router node 31 (in the case of node 37). The network nodes in the building 20 can also receive messages from the BAS via the router nodes 21 and 31. The BAS can, in this way, remotely control the light switches, heaters of other devices with which the network nodes are associated.

The interior space of the building 20 is an example of an environment that may give rise to the ENP. For instance, although the router nodes 21 and 31 may be able to observe each other's transmissions, the nodes 23, 25 and 27 on the first level may be hidden from the router node 31 on the second level, while the nodes 33, 35 and 37 on the second level may be hidden from the router node 21 on the first level. These nodes may be hidden from each other because they are out of range of each other's transmissions and/or because the walls or ceilings separating the rooms/levels may interfere with their transmissions. In these circumstances, false collisions may occur at the router nodes 21 and 31, which may both erroneously assume that they cannot transmit at the same time without causing collisions at the nodes 21, 23 25, 33, 35 and 37.

Although the wireless network described above is provided in the context of a smart building, it will be appreciated that embodiments of this invention are generally applicable to network nodes for wireless networks.

Figure 4:
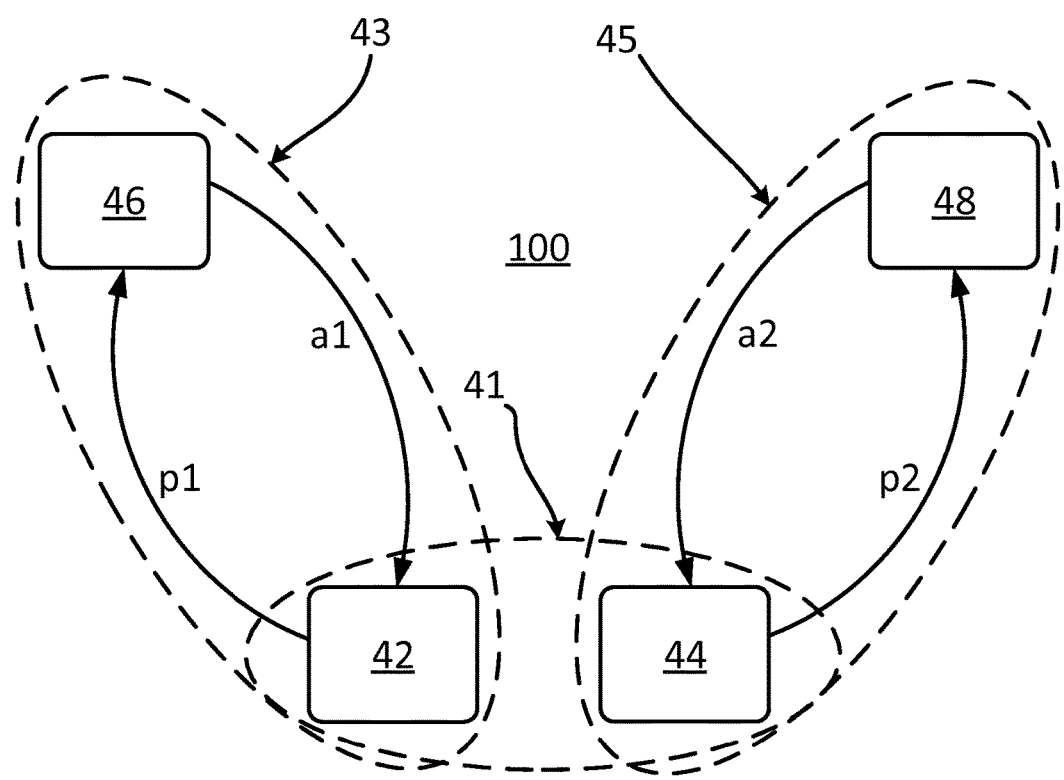
FIG. 4 shows a wireless network including a plurality of nodes in accordance with an embodiment of the invention.

FIG. 4 illustrates a wireless network 100 including a plurality of nodes 42, 44, 46, 48. For the purposes of the examples described below, the nodes 46 and 48 are assumed to be receiver nodes (they receive transmissions such as transmissions p1 and p2, respectively, and also send corresponding acknowledgments such as acknowledgements a1 and a2) and nodes 42 and 44 are assumed to be transmitter nodes (they send transmissions such as p1 and p2, respectively and also receive corresponding acknowledgments such as a1 and a2). Nevertheless, it will be appreciated that in a wireless network a node may at any given moment be either a transmitter node or a receiver node according whether it is sending or receiving transmissions. It will further be appreciated that the wireless network may in general include many more nodes than are shown in the present simplified, illustrative example.

The nodes 42, 44, 46, 48 may be nodes of the kind described above in relation to FIG. 1.

The wireless network 100 may be a network of this kind described above in relation to FIGS. 2, 3A and 3B. For instance, the node 42 may correspond to the router node 21 shown in FIG. 3A, the node 44 may correspond to the router node 31 shown in FIG. 3B, the node 46 may correspond to one of the nodes 23, 25, 27, and the node 48 may correspond to one of the nodes 33, 35, 37.

In the wireless network 100 of FIG. 4, some of the nodes are not able to observe each other's transmissions. These nodes are said to be hidden from each other. The dashed lines 41, 43, 45 indicate areas within which the enclosed nodes are able to observe each other's transmissions. For example, dashed line 41 indicates that the nodes 42 and 44 are able to observe each other's transmissions, dashed line 43 indicates that nodes 42 and 46 are able to observe each other's transmissions and dashed line 45 indicates that nodes 44 and 48 are able to observe each other's transmissions. On the other hand, node 46 is not able to observe transmissions made by nodes 44 or 48, node 48 is not able to observe transmissions made by nodes 42 or 46, node 42 is not able to observe transmissions made by node 48 and node 44 is not able to observe transmissions made by node 46. As noted above, hidden nodes can arise because the nodes concerned are either out of range of each other's transmissions or because the surrounding environment (e.g., walls, ceilings) interferes with their transmissions such that they cannot reach the other node.

In the example of FIG. 4, the ENP may arise when nodes 42 and 44 erroneously assume that they may not transmit simultaneously without causing a collision at node 46 and/or node 48. For example, when node 42 is in the process of making transmission p1 shown in FIG. 4, node 44, sensing this transmission (e.g. under CSMA), may delay its own transmission p2 to node 48, under the false assumption that if it were to make transmission p2 to node 48 while node 42 is making transmission p1 to node 46, there would be a collision at node 46 and/or node 48 of the transmissions p1 and p2. Under these circumstances, the node 44 would conventionally "back-off" its own transmission p2 until the transmission p1 has finished, or until a given time period has elapsed after the transmission p1 has finished. As noted above, because node 48 is hidden from node 42 and because node 46 is hidden from node 44, in reality, simultaneous transmission of transmission p1 and transmission p2 would not cause any collisions. The potential collision that causes node 44 to back-off from making transmission p2 until transmission p1 has finished is referred to as a "false collision".

FIG. 5 illustrates a method of reducing false collisions in a wireless network in accordance with a first embodiment of the invention. The method may be implemented by a network node according to an embodiment of this invention (such as the node 10 of FIG. 1), in wireless network 100 of the kind shown in FIG. 4.

The method starts in step 50 in which it is assumed that the node may be in an idle state. In step 52, the network node promiscuously monitors transmissions and acknowledgements that it receives. By promiscuous monitoring, it is meant that the network node processes transmissions and acknowledgements sent over the network 100, even when those transmissions and acknowledgements are not addressed to itself. For the present example, it is assumed that the network node is the node 42 shown in FIG. 4. Accordingly, the network node 42 may observe one or more transmissions sent by network node 44 to node 48 or to other nodes. The node 42 may, where the network 100 includes further nodes that are within its range, also monitor transmissions and acknowledgements sent by those further nodes.

In a next step 54, the method according to this embodiment includes the network node 42 maintaining a record of the transmissions and acknowledgements that it receives. An example of such a record will be described in more detail below in relation to FIGS. 7a and 7b. Using this record of transmissions and acknowledgements received by the network node 42 by promiscuous monitoring of traffic on the wireless network 100, the network node 42 is able to compile information relating to the network 100 that may be used to determine the presence of one or more hidden nodes in the network 100.

In a next step 56 shown in FIG. 5, the network node 42 sends information relating to the record of transmissions and acknowledgements that it maintains to another node in the network.

In some examples, the information relating to the record may be included in a normal or regular transmission that the node 42 sends over the network. In other words, the information may "piggy-back" on transmissions sent to nodes such as node 46 or other nodes in the network. With reference to FIG. 4, it can be seen that a transmission made by node 42 to node 46, which also includes the information relating to the record, would also be heard by the node 44, so that the node 44 can make use of the information as described in more detail below.

In other examples, the information may be included in one or more dedicated transmissions by the node 42, where the transmissions are made specifically for the purpose of distributing the information relating to the record.

In either case, the information relating to the record of transmissions and acknowledgements that have been received by the network node 42 may, as described in more detail below, be used by the network node 44 for determining that a further node to which it sends transmissions (in the present example, node 48) is hidden from the network node 42.

For example, and as will be elaborated upon below in relation to FIGS. 9 and 10, the network node 44 may determine, from the information received from the network node 42, that the network node 42 did not receive an acknowledgement a2 sent by network node 48 to acknowledge transmission p2 sent by network node 44 to network node 48. Network node 44 may thereby infer that network node 42 is not within range of network node 48 and that network nodes 42 and 48 are therefore hidden from each other. Network node 44 may therefore determine that simultaneous transmissions made by itself and network node 42 would not in fact cause a collision at network node 48. Network node 44 may subsequently send transmissions to network node 48 even if network node 42 is currently transmitting. In this way, false collisions in a wireless network 100 can be reduced. This may increase the efficiency of the network in a manner that need not explicitly employ collision avoidance protocols involving the use of RTS/CTS messages.

FIG. 6 illustrates a method according to another embodiment of the invention. Again, the method may be implemented by a network node such as the node 42 shown in FIG. 4.

The method starts in step 60 in which it is assumed that the network node 42 shown in FIG. 4 is promiscuously monitoring network traffic on the network 100 as noted above.

In step 62 the network node 42 receives a message sent over the network 100.

In step 64, the network node may inspect a header of the message to determine whether the message is addressed to itself. This may, for example, be determined by inspecting a node ID field of the header and comparing the node ID with its own node ID. If there is a match, the network node 42 may in step 66 process the message in a conventional manner.

However, if in step 64 it is determined that the message is not addressed to the node 42 itself, the node 42 may proceed to step 68. In step 68, the network node 42 determines whether the message is a transmission made by another node in the network 100 or whether the message is an acknowledgement of such a transmission.

If the message is a transmission sent by another node in the network 100, then the node 42 can, in step 70, process the transmission by adding it to the record of transmissions sent over the network 100 that it maintains.

On the other hand, if the message is determined in step 68 to be an acknowledgement of a transmission sent over the network 100, then the network node 42 can, in step 72, process the acknowledgement by determining whether the transmission to which the acknowledgement relates is included in the record of transmissions that it maintains. If the transmission to which the acknowledgement relates is indeed present in its record, the network node 42 can, in step 72, update the record to indicate that it has observed an acknowledgement of the transmission concerned. The methodology described above in relation to FIG. 6 can be repeated each time the network node 42 receives a message over the wireless network in order to process those messages for maintaining a record of transmissions and acknowledgements in accordance with an embodiment of this invention.

Figure 7A:
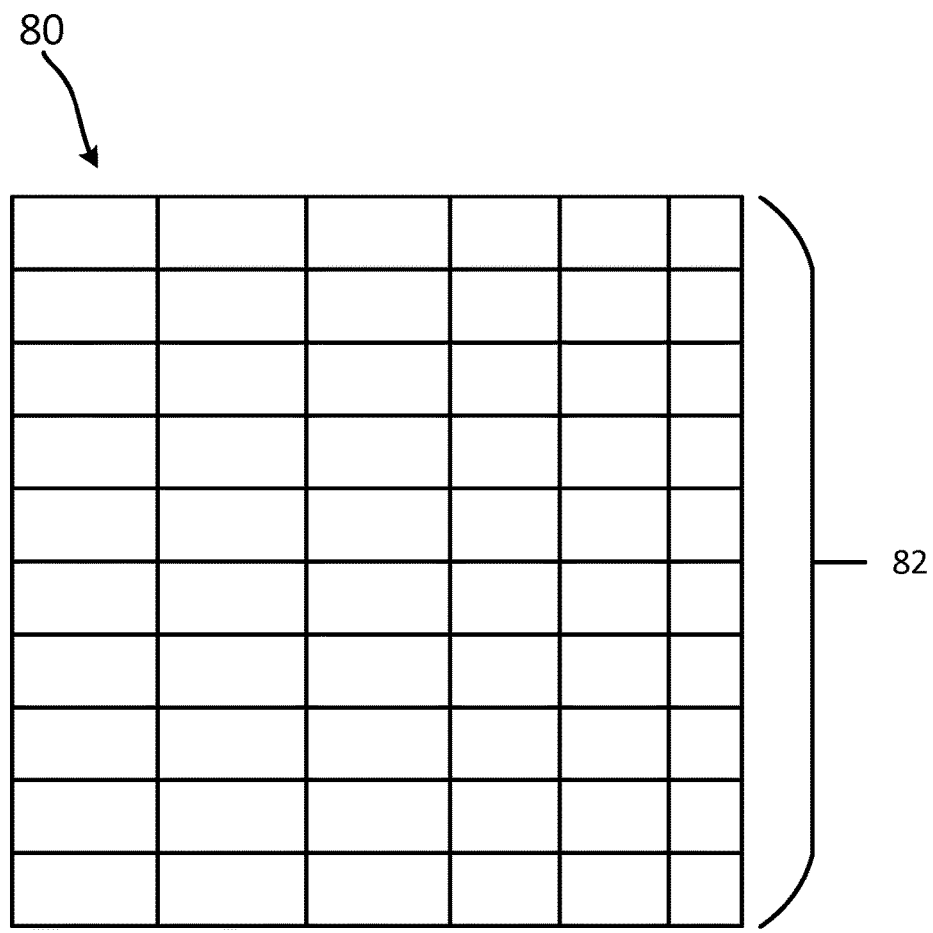
FIG. 7A shows an example of a record that may be maintained by a network node in accordance with an embodiment of the invention.

FIG. 7a illustrates an example of a record of transmissions and acknowledgements that may be maintained by the network node in accordance with an embodiment of the invention.

In the example of FIG. 7a, the record 80 includes a plurality of entries 82. As explained below, each entry 82 in the record 80 may include one or more fields. The record 80 may be held in a memory of the network node. For example, with reference to the example node 10 shown in FIG. 1, the record 80 may be stored in memory 2 and maintained by processor 4.

The record 80 may be added to each time a new transmission is observed by the network node. The node may also discard entries 82 relating to older transmissions from the record 80 in order to conserve space in the memory in which the record 80 is held. This may be achieved either by discarding record entries 82 relating to transmissions that are older than a certain predetermined period of lapsed time (for example, a milliseconds, a few seconds, etc.). Alternatively, the network node may maintain a record 80 having a fixed predetermined number of entries 82 so that as the record 80 becomes full, new transmissions are processed by overwriting entries 82 relating to older transmissions. In the further example, the network node may clear the record 80 of some or all of the entries 82 that it contains each time the network node sends information relating to the record 80 to another node in the network as explained above. In yet a further example, the network node may maintain the record 80 by discarding entries 82 relating to transmissions for which it has observed an acknowledgement (when acknowledgement to a transmission is observed, it may be assumed the node sending the acknowledgement is not hidden from the node maintaining the record).

Figure 7B:
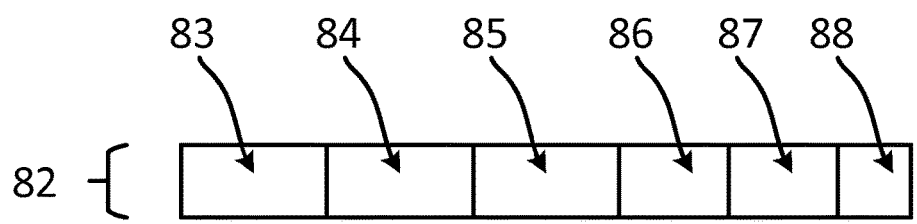
FIG. 7B shows an example entry for a record of the kind shown in FIG. 7A.

FIG. 7b illustrates an example of one of the entries 82 in a record 80 of the kind described above in relation to FIG. 7a. As shown in FIG. 7b, the entry 82 can include one or more fields 83, 84, 85, 86, 87, 88.

In the present example, the field 83 contains a transmission sequence number of the transmission to which the entry 82 relates. The transmission sequence number may uniquely identify the transmission. The transmission sequence number may be extracted from the header of the transmission during processing of the transmission by the network node in, for example, step 70 of the method described above in relation to FIG. 6.

The fields 84 and 85 of the entry 82 shown in FIG. 7b in this example include indications of the network node that sent the transmission and the network node to which the transmission was addressed. These indications may typically comprise an identification number uniquely identifying the sending network node and the receiving network node (i.e. a node ID).

The field 86 in the example entry 82 of FIG. 7b includes an indication as to the time at which the transmission was sent. The field 86 may include a time stamp. The indication as to the transmission time such as the time stamp may be produced by the network node itself on receipt of the transmission, using its own clock.

The entry 82 may include an indication in a field 88 as to whether an acknowledgement of the transmission has been observed. The indication in field 88 may, for example, comprise a flag such as a bit that may be set on observation of a corresponding acknowledgement. As noted above, on receipt of an acknowledgement relating to a transmission contained in the record 80, the network node may discard the entry 82. This may be implemented by periodically discarding all entries 82 within the record 80 for which the flag in field 88 is set.

The entry 82 may include one or more further such as field 87, for carrying other information.

Figure 8:
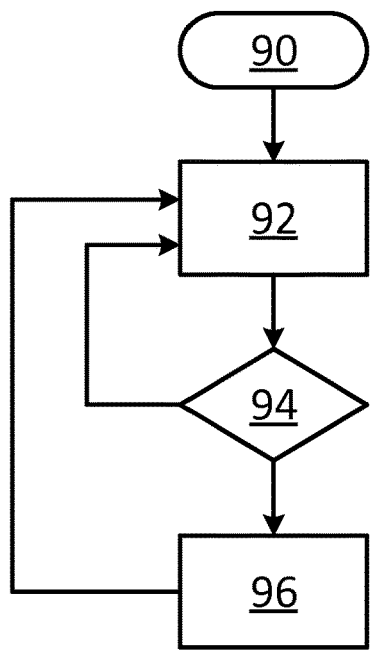
FIGS. 8 to 10 each show a method according to an embodiment of the invention.

FIG. 8 illustrates the steps of a method according to another embodiment of the invention. Again, the method may be implemented by a network node such as the node 42 shown in FIG. 4.

The method of FIG. 8 starts in step 90, in which the network node 42 is assumed to be promiscuously monitoring transmissions and acknowledgements that it receives and maintaining the above-discussed record of such transmissions and acknowledgements.

In step 92, the network node 42 may begin processing the entries 82 maintained in the record 80 to prepare information relating to the record that can be sent to another node in the network for determining that a further node to which the other node sends transmissions is hidden from the network node 42. In step 92, the network node processes a next entry 82 in the record and in step 94 may determine by inspecting the field 88 of the entry 82, whether an acknowledgment to the transmission to which the entry 82 relates has been observed. If the network node 42 determines in step 94 that an acknowledgement of the transmission has observed, the method may return to step 92 in which annexed entry 82 of the record 80 is processed.

Alternatively, if in step 94 it is determined that an acknowledgement of the transmission to which the entry 82 relates has not been observed, then the network node 42 can in step 96 send to another node in the network (e.g. as explained above, this can be achieved by including the information in a future regular transmission ("piggy-backing" or by using dedicated transmissions) an indication of the fact that the transmission to which the entry 82 relates was observed by the network node 42 but that a corresponding acknowledgement was not observed. In some examples, where the transmission is a dedicated transmission for distributing the information, the network node 42 may address this information specifically to the network node that originally sent the transmission to which the entry 82 relates. The identity and address of the network node to which the entry 82 relates can be extracted from the original transmission itself as explained above in relation to FIG. 6 and may be stored in the field 84 of the entry 82 as explained above in relation to FIG. 7b. Alternatively, the network node 42 may broadcast the information to all nodes in the network that can receive its transmissions.

After the entry 82 has been processed in step 96 by sending the above-mentioned information to another node in the network, the method can return to step 92 in which a next entry 82 in the record 80 can be processed. The methodology described above in relation to FIG. 8 can be repeated until each entry 82 in the record 80 has been processed.

In some examples, the method of FIG. 8 can be implemented each time a new transmission has been received and observed as not being acknowledged. For example, when a new transmission is received by the network node, the time stamp in the field 86 of the entry 82 may be used to implement a timeout mechanism by which the information noted above is sent to another network node after a certain timeout period has elapsed. Thus, the method of FIG. 8 described above may include a further step of determining whether, for each entry 82 for which an acknowledgement has not been observed, the time out period for that particular transmission has also expired. In such examples, the information relating to the entry 82 or the record 80 would only be sent to the other node in the network where the time out period had indeed expired.

In some examples, the information sent to the other network node may relate to more than one of the entries 82 in the record 80. By sending information relating to multiple entries 82 in a single payload, the network overhead in terms of traffic associated with sending information relating to the record may be reduced, since the number of individual transmissions required to distribute the information is reduced. As noted above, in some examples, the information can "piggy-back" (be included in) existing transmissions conventionally used in the network 100. For example, the information may not be sent in its own dedicated transmission but may instead by included in an Information Element (IE) extension of a transmission or an acknowledgment subsequently sent by the network node 42 over the network 100. Other nodes in the network may promiscuously monitor these transmissions even if they are not addressed to themselves and may extract the information relating to the record 80 maintained by the network node 42 in order to determine whether they are exposed nodes as described herein.

In the preceding description, it has been explained that a network node such as network node 42 in a wireless network such as network 100 shown in FIG. 4 can maintain a record 80 of transmissions and acknowledgements sent over the network 100 by promiscuously monitoring those transmissions and acknowledgements. It has also been explained that the network node 42 may send information relating to the record to another network node so that the other network node can determine the presence of hidden nodes within the network. In relation to FIGS. 9 and 10, it will now be described how the other network node can process the information once it information has been received from the network node 42.

Figure 9:
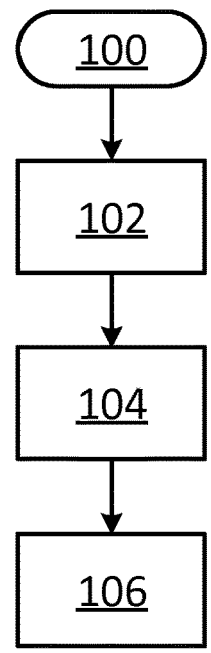

FIG. 9 illustrates a number of steps in accordance with an embodiment of this invention. For the present example, the steps are assumed to be implemented by a network node such as network node 44 in a wireless network such as network 100 shown in FIG. 4. The method starts in step 100 in which the network node 44 is assumed to be in an idle state.

In step 102, the network node 44 sends one or more transmissions over the network 100. For the present example, it will be assumed that these one or more transmissions are transmissions such as transmission p2 shown in FIG. 4 and that these transmissions are sent to network node 48. It will be appreciated however, that network node 44 may send transmissions to other nodes within the network 100. In step 102 of FIG. 9, network node 44 also receives one or more acknowledgements relating to the transmissions that it has sent. For example, in FIG. 4 it is shown that after receiving transmission p2, network node 48 sends an acknowledgement a2 to network node 44 to confirm receipt of transmission p2.

In step 104, the network node 44 receives from network node 42 information relating to one or more transmissions sent over the network 100. This information may comprise information relating to a transmission p2 sent by network node 44 to network node 48, which was monitored by node 42. The information may, as explained above, also include information relating to other transmissions sent over the network 100. As also explained above, the information can be received from the node 42 as part of a regular transmission made by node 42. The information can piggy-back the regular transmission, and it is noted that the transmission of the this kind, in which the information is included, may be a regular transmission that is addressed to a node other than node 44 (e.g. it may be a regular transmission made by node 42 to node 46). Node 44 may nevertheless promiscuously process these regular transmissions to extract the information. As further explained above, the information may alternatively be received by node 44 from node 42 in a dedicated transmission.

In step 106 of FIG. 9, the network node 44 determines from the information that it has received from the network node 42 whether the network node 48 is hidden from network node 42. If it is determined by the network node 44 in step 106 that network node 48 is hidden from network node 42, in subsequent communications the network node 44 may transmit to network node 48 even while network node 42 is transmitting. Network node 44 assumes that if network node 42 is unable to observe acknowledgement messages sent by network node 48, then network node 48 is also unable to observe transmissions sent by network node 42. Consequently, network node 44 may assume that it can transmit to network node 48 without causing a collision at node 48.

Figure 10:
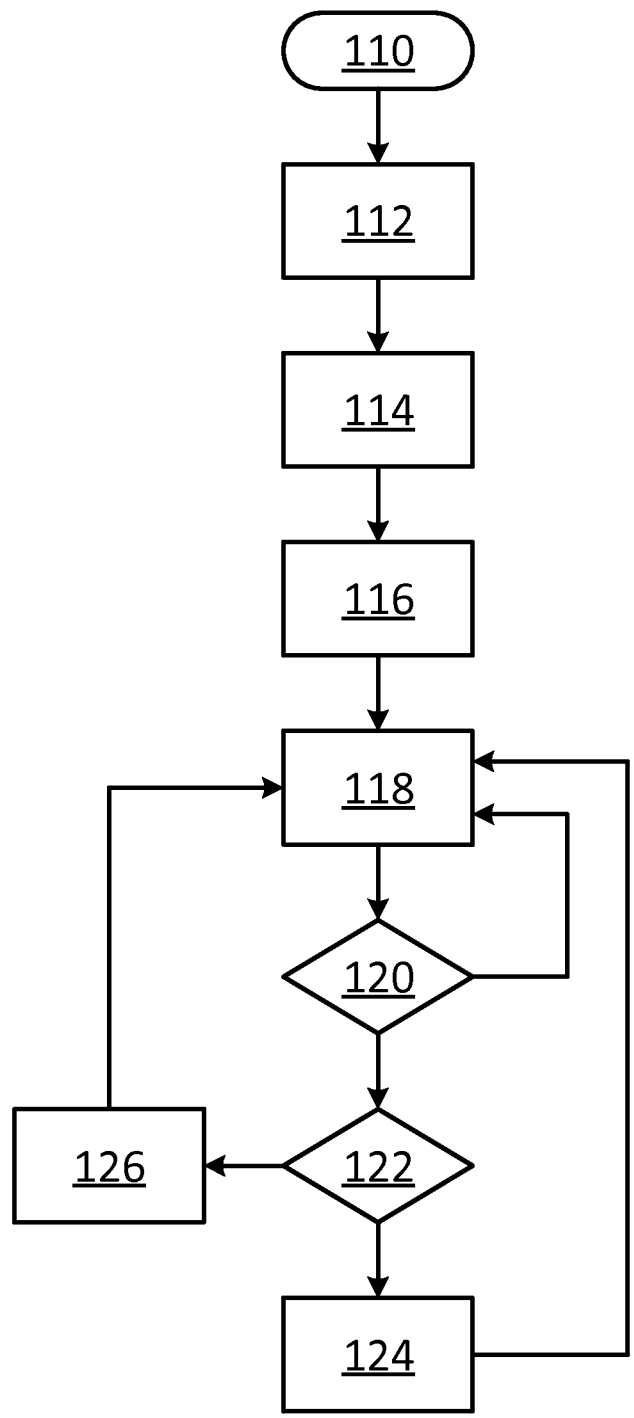

FIG. 10 illustrates the method of FIG. 9 in greater detail. The method of FIG. 10 starts in step 110 in which it is again assumed that the network node 44 is in an idle state.

In step 112, the network node 44 sends one or more transmissions over the network 100 and receives one or more acknowledgements relating to those transmissions. In the present example, these transmissions include transmission p2 shown in FIG. 4. Transmission p2 is assumed to be acknowledged by node 48 using acknowledgement a2.

In accordance with the present embodiment, the network node 44 maintains a record of the transmissions that it sends and the acknowledgements that it receives. This record can include a transmission sequence number of each transmission and further details such as the time of each transmission, the node ID of the node to which each transmission has been sent and a flag indicating whether the node 44 has received an acknowledgment of the transmission. Thus, in step 114, each time a transmission is sent by node 44, the node 44 may update its record. The record in the present example includes an entry relating to transmission p2 and acknowledgement a2.

In step 116, the node 44 receives information from the node 42 shown in FIG. 4 that relates to transmissions sent over the network 100. Since node 42 shown in FIG. 4 is within range (see the dashed line 31) of transmissions sent by node 44, node 42 will have observed transmission p2 sent to node 48. However, since node 42 is not able to observe transmissions or acknowledgements sent by node 48, node 42 will not have observed the acknowledgement a2 sent by node 48 to node 44. As explained above, the information sent by the node 42 to the node 44 can include an indication as to transmissions that the node 42 has observed but for which an acknowledgement was not observed by node 42. Accordingly, in the present example, the information sent by the node 42 to the node 44 will include at least an indication of transmission p2. The information may relate to a plurality of transmissions served by the node 42 for which the node 42 did not observe an acknowledgement, in which case the transmission p2 shown in FIG. 4 would be just an example of the transmissions contained within the information.

The node 44 begins processing the information received from the node 42 in step 118 of the method shown in FIG. 10. In step 118, the node 44 extracts the content of the information received from the node 42 and inspects information relating to a first transmission contained in the information. This information can include a sequence number of the transmission.

In step 120 of FIG. 10, the network node 44 can inspect the sequence number of the transmission referred to in the information sent by the network node 42 and can compare the sequence number with the transmission sequence numbers in its own record of the transmissions that it has sent.

In an alternative example, instead of directly comparing sequence numbers, the network node 44 can determine if an observed sequence number belongs to it by fast-forwarding a Pseudo-random Number Generator (PRNG) used by the node 44 by using the sequence number as a seed and drawing samples from the PRNG until it finds its current seed (within a certain number of tries). In another example, where a Hardware (HW) based Random Number Generator (RNG) is used, a number of past observations can be saved in a cache for this comparison.

If it is determined in step 120 that the transmission sequence number does not belong to the network node 44, the network node 44 can return to step 118 to move to a next transmission indicated in the information sent by the network node 42. On the other hand, if it is determined in step 120 that the sequence number of the transmission referred to in the information sent by the network node 42 corresponds to a transmission (in this example p2) that has been sent by the network node 44, then the network node 44 can conclude that the network node 42 did not observe an acknowledgement (in this example a2) to that transmission (because the sequence numbers in the information sent by node 42 correspond to transmissions for which node 42 did not observe an acknowledgement).

In step 122, the network node 44 may check its own record to verify whether the network node 44 itself did receive the acknowledgment. If it is determined in step 122 that the network node 44 itself did not receive an acknowledgement to the transmission, then in step 126 the network node 44 can in step 126, determine that network node 48 is not necessarily hidden from network node 42 because network node 44 also did not receive the appropriate acknowledgement to the transmission. The failure to receive an acknowledgement to the transmission may arise because node 48 did not correctly receive transmission p2, and this can be processed in a conventional manner such as by sending a negative acknowledgement message to the network node 48. However, for the purposes of this example no determination can be made by the network node 44 as to whether the network node 48 is hidden from node 42.

On the other hand if in step 122 it is determined by the network node 44, by inspection of its own record of the transmissions and acknowledgements that it has sent and received, that it did indeed receive an acknowledgement (in this example a2) to the transmission (in this example, p2) referred to in the information received from the network node 42, then the network node 44 can determine that network node 42 is unable to observe traffic sent over the wireless network 100 by network node 48. From this, it can infer that network node 48 would also be unable to hear transmissions sent by network node 42. Subsequently, network node 44 may send future transmissions to network node 48 even when network node 42 is currently transmitting, in the knowledge that this would not cause a collision of the transmissions sent by network nodes 42 and 44 at network node 48.

After step 124, the method of FIG. 10 can return to step 118 in which a next transmission indicated in the information received from the network node 42 can be processed. The method of FIG. 10 can be repeated until each of the transmissions indicated in the information received from the network node 42 have been processed.

In the examples described above, network node 42 has been assumed to be the node in the network that promiscuously monitors transmissions and acknowledgements sent over the wireless network 100 and the network node 44 has been assumed to be the node which receives information from the network node 42 relating to the transmissions and acknowledgements observed by the network node 42. However, it will be appreciated that the functionality implemented by network node 42 and network node 44 may be combined such that each node in the network is able to perform the promiscuous monitoring function and also to receive information relating to transmissions and acknowledgements promiscuously monitored by other nodes in the network and to process the information to determine the presence of hidden nodes. In this way, each node in the network may be able to determine the presence of hidden nodes in the network and thereby reduce the number of false collisions using that knowledge, and also to communicate to other nodes in the network information relating to transmissions and acknowledgements that it has itself observed in order that the other nodes in the network can themselves determine the presence of hidden nodes.

The reduction in false collisions that may be achieved in accordance with one more embodiments of this invention may increase the efficiency of the network. For example, a reduction in false collisions may reduce instances in which network nodes unnecessarily "back-off" from sending their transmissions while other nodes in the vicinity are transmitting. In the case of false collisions associated with the ENP, the delay in transmission caused by these back-offs may be avoided in accordance with embodiments of this invention.

Accordingly, there has been described a network node for a wireless network and corresponding methods for reducing false collisions in a wireless network, a wireless network, a wireless sensor network and a smart building including a wireless sensor network. The network node includes a processor, memory and an antenna. The network node is operable promiscuously to monitor and maintain a record of transmissions and acknowledgements received by the network node. The network node is also operable to send information relating to the record to another node in the network for use by the other node in identifying that a further node to which the other node sends transmissions is hidden from the network node. In another aspect the network node is operable to determine from information received from a second other network node, whether a first other network node is hidden from the second other network node.

Although particular embodiments of the invention have been described, it will be appreciated that many modifications/additions and/or substitutions may be made within the scope of the claimed invention.

The invention claimed is:

1. A network node for a wireless network, the network node comprising:
   a processor;
   memory; and
   an antenna;
   wherein the network node is configured to:
      promiscuously monitor transmissions and acknowledgements received by the network node;
      maintain a record of the transmissions and acknowledgements, the record including a sequence number for a transmission from the network node; and
      send information relating to the record to another node in the network for use by the another node in determining that a further node to which the another node sends transmissions is hidden from the network node, wherein information maintained in the record and sent to the another node includes at least a first transmission sequence number, wherein the at least a first transmission sequence number is separate from a time stamp, which indicates a time at which a transmission was sent, and wherein the at least a first transmission sequence number corresponds to a transmission from the network node;
      wherein the information relating to the record is sent as part of a transmission broadcast across the wireless network
   wherein the network node is configured to:
      send one or more transmissions to a first other network node and receive acknowledgements of said transmissions from said first other network node;
      receive, from a second other network node, information relating to said one or more transmissions, wherein the information received from the second other network node includes at least a second transmission sequence number; and
      determine from information received from the first other network node and from the second other network node, including from an acknowledgement received from the first other network node and from said at least a second transmission sequence number received from the second other network node, that the first other network node is hidden from the second other network node, wherein said determining comprises comparing the first transmission sequence number maintained in the record with the second transmission sequence number to determine if the second transmission sequence number corresponds to the first transmission sequence number maintained in the record of the network node and determining that the first other network node is hidden from the second other network node if an acknowledgement is received at the network node from the first other network node for a transmission having the first transmission sequence number and if the network node determines that the second transmission sequence number corresponds to the first transmission sequence number maintained in the record of the network node.

2. The network node of claim 1,
   wherein the information relating to the record comprises an indication of at least one transmission sent by the another node to the further node and promiscuously monitored by the network node, for which the network node did not observe an acknowledgement from the further node.

3. The network node of claim 2,
   wherein the information relating to the record comprises an indication of at least one transmission sent by the another node to the further node and promiscuously monitored by the network node, for which the network node did not observe an acknowledgement from the further node within a predetermined time period.

4. The network node of claim 3,
   wherein the network node is further configured to send the information relating to the record to said another node after the predetermined time period has elapsed without having observed an acknowledgement of the promiscuously monitored transmission.

5. A wireless network comprising a plurality of nodes according to claim 1.

6. A wireless sensor network comprising the network of claim 5, wherein at least some of the network nodes include one or more environmental sensors.

7. A smart building comprising the wireless sensor network of claim 6.

8. The network node of claim 1,
   wherein the network node is further configured to discard an entry in the record when a flag indicating that a corresponding transmission for the entry has been received.

9. A network node for a wireless network, the network node comprising:
- a processor;
- memory; and
- an antenna;
- wherein the network node is configured to:
  - send one or more transmissions to a first other network node and receive acknowledgements of said transmissions from said first other network node, wherein a first set of information in the one or more transmissions sent to the first other node includes at least a first transmission sequence number, wherein the first transmission sequence number is separate from a time stamp, which indicates a time at which a transmission was sent;
  - maintain a record of said one or more transmissions sent to the first other network node, including the first transmission sequence number;
  - receive, from a second other network node, a second set of information relating to said one or more transmissions, wherein the second set of information received from the second other network node includes at least a second transmission sequence number, wherein the at least a second transmission sequence number is separate from a time stamp, which indicates a time at which a transmission was sent, wherein the second set of information is received as part of a transmission broadcast across the wireless network; and
  - determine from information received from the first other network node and from the second other network node, including from an acknowledgement received from the first other network node and from said at least a second transmission sequence number received from the second other network node, that the first other network node is hidden from the second other network node, wherein said determining comprises comparing the first transmission sequence number maintained in the record with the second transmission sequence number to determine if the second transmission sequence number corresponds to the first transmission sequence number maintained in the record of the network node and determining that the first other network node is hidden from the second other network node if an acknowledgement is received at the network node from the first other network node for a transmission having the first transmission sequence number and if the network node determines that the second transmission sequence number corresponds to the first transmission sequence number maintained in the record of the network node.

10. The network node of claim 9, further configured to compare said second set of information received from the second other network node with the record to determine that the second other network node did not observe an acknowledgement corresponding to a transmission, whereas the network node itself did receive the acknowledgement.

11. The network node of claim 9, wherein the network node is further configured, after determining that the first other network node is hidden from the second other network node, to transmit to the first other network node even when the second other network node is transmitting.

12. A method for reducing false collisions in a wireless network, the method comprising a network node:
- sending one or more transmissions to a first other network node and receiving acknowledgements of said transmissions from said first other network node, the one or more transmissions including a first transmission sequence number;
- maintaining a record at the network node of the first transmission sequence number;
- receiving, from a second other network node, information relating to said one or more transmissions, wherein the information is received as part of a transmission broadcast across the wireless network, wherein the information received as part of a transmission broadcast across the wireless network includes a second transmission sequence number, wherein the second transmission sequence number is separate from a time stamp, which indicates a time at which a transmission was sent; and
- determining from information received from first other network node and from the second other network node, including from an acknowledgement received from the first other network node and from the second transmission sequence number, that the first other network node is hidden from the second other network node, wherein said determining comprises comparing the first transmission sequence number maintained in the record with the second transmission sequence number to determine if the second transmission sequence number corresponds to the first transmission sequence number maintained in the record of the network node and determining that the first other network node is hidden from the second other network node if an acknowledgement is received at the network node from the first other network node for a transmission having the first transmission sequence number and if the network node determines that the second transmission sequence number corresponds to the first transmission sequence number maintained in the record of the network node.

* * * * *